United States Patent [19]

Richardson

[11] Patent Number: 5,526,773
[45] Date of Patent: Jun. 18, 1996

[54] ANCHORED PET DISH

[76] Inventor: Terry S. Richardson, 355 Claremont, Apt. 5E, San Antonio, Tex. 78209

[21] Appl. No.: 327,008

[22] Filed: Oct. 21, 1994

[51] Int. Cl.⁶ .............................................. A01K 5/01
[52] U.S. Cl. ........................... 119/51.5; 119/61; 248/156
[58] Field of Search ................... 119/51.5, 61; 248/156, 248/907; 220/730, 484

[56] References Cited

U.S. PATENT DOCUMENTS

| | | | |
|---|---|---|---|
| 180,277 | 7/1876 | Schmitt | 220/484 |
| 1,879,220 | 9/1932 | Harmony | 248/156 |
| 2,484,263 | 10/1949 | Atkinson | 119/61 |
| 2,613,010 | 10/1952 | Atkinson | 248/156 |
| 2,772,660 | 12/1956 | Saul | 119/61 |
| 3,195,510 | 7/1965 | Berstein | 119/61 |
| 3,202,131 | 9/1965 | Jones | 119/61 |
| 4,007,711 | 2/1977 | Michael | 119/51.5 |
| 4,546,730 | 10/1985 | Holland | 119/117 |
| 4,587,930 | 5/1986 | Trego | 119/61 |
| 4,803,954 | 2/1989 | Welch et al. | 119/61 |
| 4,966,099 | 10/1990 | Arney | 119/61 |
| 5,000,123 | 3/1991 | Morse et al. | 119/61 |
| 5,069,167 | 12/1991 | Kasselman | 119/61 |
| 5,148,626 | 9/1992 | Haake, Sr. | 43/121 |
| 5,165,365 | 11/1992 | Thompson | 119/61 |
| 5,224,443 | 7/1993 | Leslie | 119/20 |
| 5,245,948 | 9/1993 | McClellan | 119/51.5 |
| 5,253,609 | 10/1993 | Partelow et al. | 119/61 |
| 5,277,149 | 1/1994 | East | 119/51.5 |
| 5,285,749 | 2/1994 | Byer | 119/61 |

FOREIGN PATENT DOCUMENTS 165262  9/1955  Australia ............................... 220/484

OTHER PUBLICATIONS

"Tied Animal Cannot Tangle Rope Or Spill Drinking Water", POPULAR MECHANICS, Dec., 1943. p. 131.

Primary Examiner—Todd E. Manahan
Attorney, Agent, or Firm—Gunn, Lee & Miller

[57] ABSTRACT

A three-piece pet food water dish assembly is capable of withstanding spillage and inhibits the ability of crawling insects to access the food and water containers. The invention incorporates a feeder component with one or more container sections that is insertable into a holder component that itself is anchored to the ground. The holder component structure further incorporates an internal annular trench that, when filled with water, prevents access to the surrounded feeder component by crawling insects. The assembly allows for easy insertion and removal of the feeder component from the holder component in a manner that facilitates the addition or removal of food and water for the pet. The holder component structure allows for the ease of insertion and removal of the feeder component while still maintaining its isolation from the ground and crawling insects through means of the annular trench and still maintaining its stability through its nearly complete enclosure by the holder component.

4 Claims, 2 Drawing Sheets

ANCHORED PET DISH

BACKGROUND OF THE INVENTION

1. Field of the Invention

The invention relates generally to pet food and water containers. The invention relates more specifically to a pet food and water dish arrangement capable of withstanding spills, particularly of being overturned by tether chains or the like. This ability is obtained by a base and anchoring apparatus. In addition, the anchored pet food dish is resistant to small, crawling insects through the use of a water trough incorporated into the base.

2. Description of the Related Art

In many households today, both husband and wife work. In these instances, pets are left unattended outdoors most of the day. It is not unusual for a chained pet to tangle itself around trees, pet dishes or a number of other objects. In most cases, the pet ends up overturning their food and water dishes. The animal may go without water the whole day.

A second problem frequently encountered with outdoor pet food and water containers involves their attraction of small insects. Such insects, ants in particular, can make the food unpalatable for the animal within a very short period of time.

Both of the above are major problems for pet owners, not to mention a hot and thirsty animal. In the past, anchors and insect repellant designs have been used with pet dishes in various ways.

U.S. Pat. No. 5,165,365 (Thompson) utilizes an anchor primarily for stabilizing and support of an elevated dining area and to retain a tether line.

U.S. Pat. No. 5,148,626 (Haake, Sr.) utilizes an anchor to prevent a protective cover for a feeder dish from being displaced. If there is no danger of displacement, the anchor may be omitted.

U.S. Pat. No. 5,069,167 (Kasselman) features a pet feeder base that is receptive to an anchor device. The design features a water filled moat to deter crawling insects.

U.S. Pat. No. 5,224,443 (Leslie) utilizes a spring hook anchor device to secure a food reservoir to either a slotted or meshed floor in an animal pen.

U.S. Pat. No. 4,546,730 (Holland) utilizes an anchor device mainly to support an umbrella. The anchor device also functions to stabilize a feeding bowl. The bowl in turn helps ensure the anchor remains perpendicular in the ground.

U.S. Pat. No. 3,202,131 (Jones) utilizes two prongs that are depressed into the grass or earth. The prongs help the bowl to resist movement.

U.S. Pat. No. 5,245,948 (McClellan) features a water filled moat surrounding a food container to deter crawling insects.

U.S. Pat. No. 5,253,609 (Partelow et al.) features several water filled moats and at least one climbing obstacle to deter crawling insects.

U.S. Pat. No. 5,277,149 (East) features an upper food dish supported over a lower water dish to deter crawling insects.

In the past, there have been many attempts to produce pet feeders that are resistant to small, crawling insects, are resistant to spillage and unwanted movement or both. Despite these earlier designs, there still remains a need for a practical, inexpensive, pet feeder which solves both problems. One with ease of assembly, indoor/outdoor use, resistance to both spills and small crawling insects, and which is child safe.

SUMMARY OF THE INVENTION

The primary purpose of this invention is to provide a pet feeder which is resistant to spills, especially being overturned by the pet's chain. This is accomplished by a corkscrew-type anchor device, which screws down into the ground and which is threaded into an anchored base unit. The food and water dish itself fits down inside the base. The dish unit can be used alone inside the house or with the base unit outside the house.

A secondary purpose of this invention is to prevent small, crawling insects from gaining access to the pet dish. This is accomplished by filling a trough in the base with water.

This invention, unlike past attempts combines these two features, retains the general size and configuration of the average pet feeder, is usable both indoors and outdoors, supplies all needed materials, and is safe enough for a child to assemble.

DETAILED DESCRIPTION OF THE PREFERRED EMBODIMENT

Figure 1:
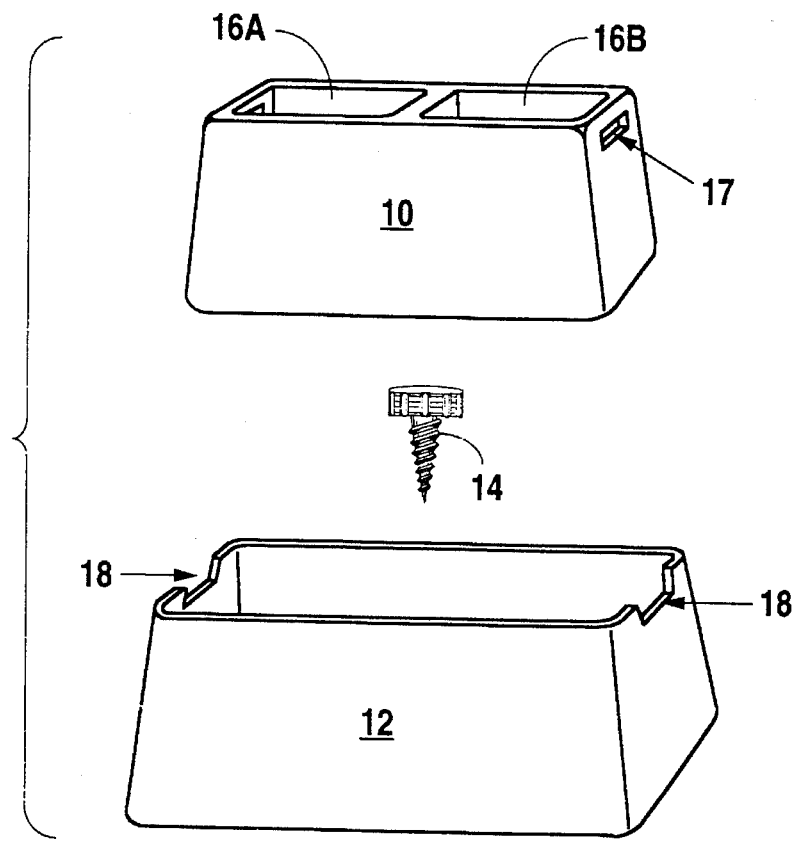
FIG. 1 is an exploded view of the spill-free, crawling insect resistant, pet feeder, showing the hand tightened screw anchor, the feeder holder with water filled trench insect barrier and the lift-out indoor/outdoor pet feeder.

Reference is first made to FIG. 1 for a general description of the components and the assembly of the present invention.

FIG. 1 shows the three primary components namely; pet feeder unit (10), feeder holder (12) and screw anchor (14). Pet feeder (10) includes food and water receptacles (16a) and (16b). Pet feeder (10) also incorporates handle apertures (17).

Feeder holder (12) is configured so as to receive pet feeder unit (10) from above as indicated and incorporates handle depressions (18) that match up with handle apertures (17) in pet feeder (10). Each of the three primary components of the present invention are, in the preferred embodiment, molded from semi-rigid plastic material.

Figures 2A, 2B:
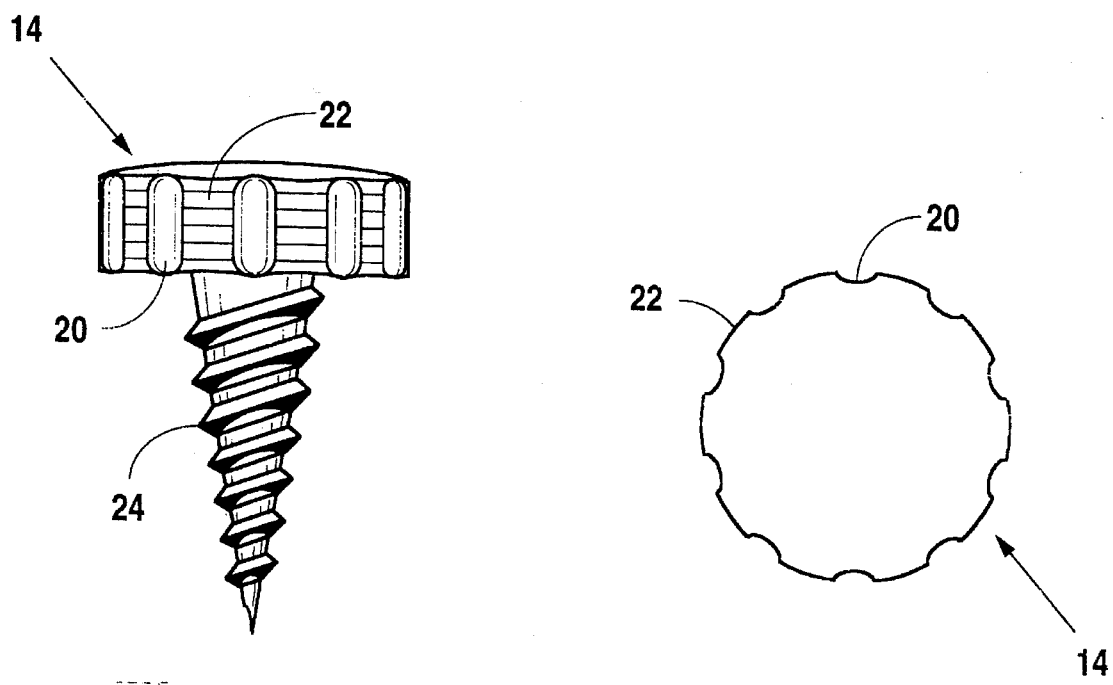
FIG. 2A is an enlarged view of the hand tightened screw anchor.
FIG. 2B is a top view of the screw anchor shown in FIG. 2.

References now made to FIGS. 2A and 2B for a detailed description of the structure of screw anchor (14). In FIG. 2A, screw anchor (14) is shown as having a helicle screw structure (24) for insertion into the ground and knobs (22) and depressions (20) to facilitate the rotation of screw anchor (14) and its insertion into the ground. FIG. 2B further discloses knobs (22) and depressions (20) in the structure of the head of screw anchor (14) in a manner that facilitates its rotation into the ground by hand. The helicle screw planes (24) of screw anchor (14) are of a depth sufficient for the retention of the anchor in moderately dense soil. In addition, knobs (22) of screw anchor (14), are themselves threaded so as to be more rigidly attached to feeder holder (12) as is described in more detail below.

Figure 3:
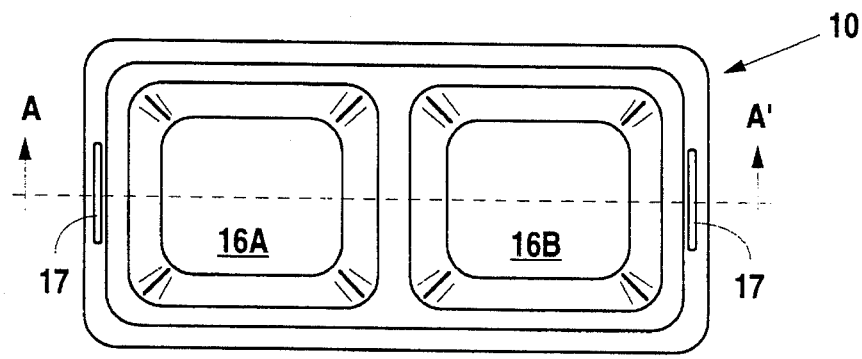
FIG. 3 is a top view of the lift-out indoor/outdoor pet feeder.

Reference is now made to FIG. 3 for a more detailed description of the configuration of pet feeder unit (10). In the view from above shown in FIG. 3, pet feeder (10) can be seen as comprising food and water container sections (16a) and (16b) typical of such pet feeder configurations. FIG. 3 also discloses the positions of handle apertures (17) on either side of pet feeder (10) in a manner that allows the easy insertion and removal of pet feeder (10) from feeder holder (12).

Figure 4:
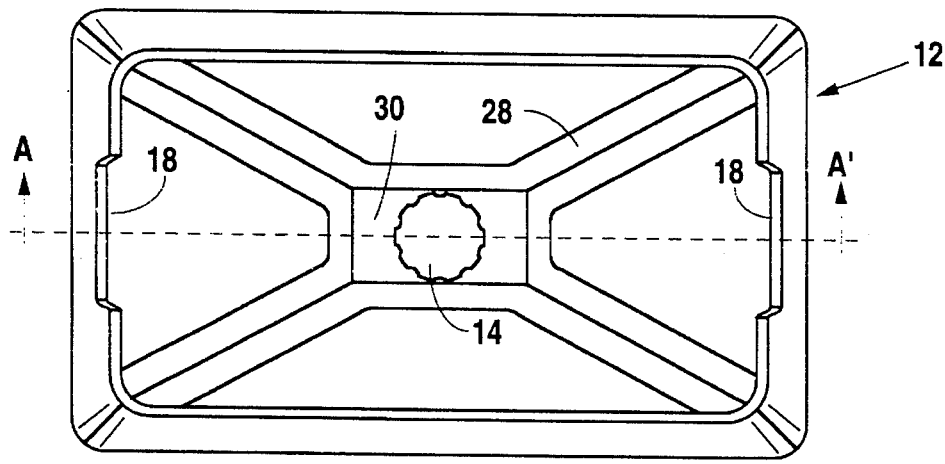
FIG. 4 is a top view of the feeder holder.

Reference is now made to FIG. 4 for a detailed description of the structure of feeder holder (12) and its manner of attachment to the ground. FIG. 4 discloses the position of handle depressions (18) that allow for the easy insertion and removal of pet feeder (10) through the use of handle apertures (17) thereon. FIG. 4 further discloses the position of base structure (28) and anchor plate (30) within the unitary molded configuration of feeder holder (12). Base structure (28) and anchor plate (30) are, in the preferred embodiment, molded into a single piece with feeder holder (12) in a manner that allows the insertion of anchor (14) through a threaded aperture (not shown) in anchor plate (30) and the retention of the body of feeder holder (12) through its molded attachment to base structure (28). The continuous molded structure of feeder holder (12) is better shown in cross-section in FIG. 5. The cross-section of FIG. 5 derives from views A—A' in both FIGS. 3 and 4.

Figure 5:
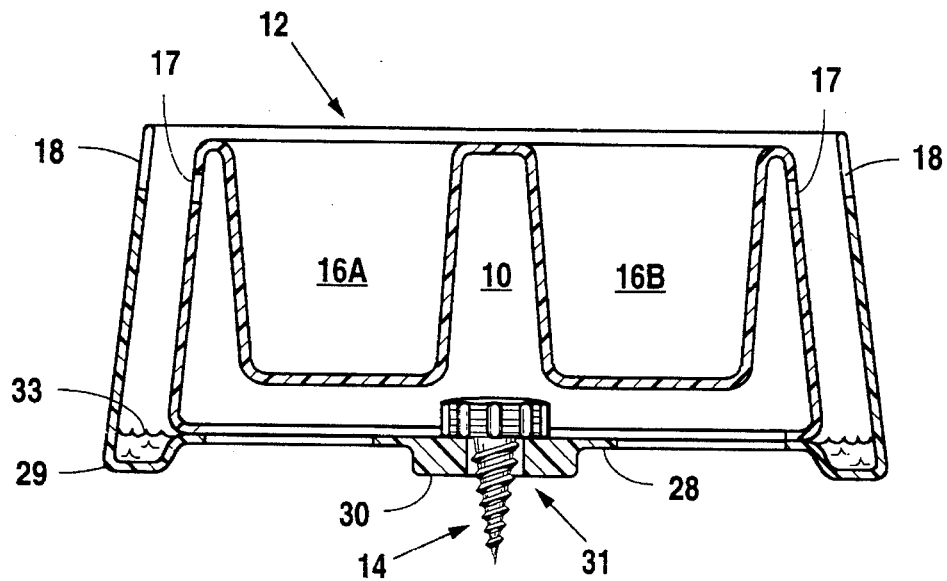
FIG. 5 is a cross-sectional view of the assembled pet feeder.

Reference is now made to FIG. 5 for a more detailed description of the cross-sectional structure of both pet feeder (10) and feeder holder (12). Cut generally through the middle of the assembled structure, FIG. 5 discloses in pet feeder (10), both food and water compartments (16a) and (16b) and handle apertures (17). Handle depressions (18) formed in feeder holder (12) are also disclosed in their position relative to handle apertures (17).

Pet feeder (10) is shown as it would be inserted into and as it would be held captive by feeder holder (12). The dimensions of pet feeder (10) arc such that it may be inserted into the upper opening of feeder holder (12) and be generally retained in an upright position therein.

In addition, anchor (14) is shown as it would be positioned through a threaded aperture (31) in anchor plate (30) integral to holder (12). Base (28) is shown as it is molded into the structure of holder (12). In the preferred embodiment anchor (14) would be simultaneously threaded through aperture (31) and screwed into the exterior ground surface so as to secure feeder holder (12) to the ground.

The interior base lip of holder (12), where water may be placed to prevent access of crawling insects into feeder (10), is best shown in FIG. 5. Annular trench (29) is molded into the unitary structure of holder (12) in a manner that creates water trough (33). Feeder (10) is then isolated from contact with the ground surface by way of water trough (33).

Although the invention has been described in connection with the preferred embodiment, it is not intended to limit the invention's particular form set forth, but on the contrary, it is intended to cover such alternatives, modifications, and equivalences that may be included in the spirit and scope of the invention as defined by the appended claims.

I claim:

1. A pet food and water dish assembly comprising:

a feeder component, said feeder component comprising a molded, thin-walled structure defining a first and a second depression for the retention of food and water;

a holder component, said holder component comprising a molded, thin-walled structure defining a primarily aperture and an enclosure for receiving and partially enclosing said feeder component in a manner that allows access to said first and second depressions in said feeder component, said holder component permitting movement of said feeder component through said primary aperture, said holder component further comprising an internal annular base trench molded into said thin-walled structure of said holder component, said trench having an inside annular lip positioned to support said feeder component when said feeder component is placed within said holder component, wherein said internal annual base trench is exposed and may be filled with water when said feeder component is removed from said holder component and is covered when said feeder component is placed within said holder component; and an anchor screw for insertion through a secondary aperture located in a base portion of said holder component, said secondary aperture having threads for receiving said anchor screw, said anchor screw for insertion into and adherence to a ground surface upon which said assembly is placed, said anchor screw serving to retain said holder component in a fixed position on said ground surface and thereby to retain said feeder component in a fixed position with respect to said ground surface, said secondary aperture threads serving to prevent rotation of said holder component in said fixed position on said surface.

2. The assembly of claim 1, wherein said feeder component further comprises handle means for insertion and removal of said feeder component into and from said holder component.

3. The assembly of claim 2, wherein said holder component further comprises handle receptor means allowing access to said handle means of said feeder component.

4. The assembly of claim 1, wherein said molded thin-walled structure of both said feeder component and said holder component are manufactured of a semi-rigid plastic material.

* * * * *